United States Patent

Cicognani et al.

[15] 3,691,471

[45] Sept. 12, 1972

[54] KEY MODULATED PULSE-TRAIN GENERATOR FOR TELECOMMUNICATION SYSTEM

[72] Inventors: Enrico Cicognani; Evangelo Lyghounis, both of Milan, Italy

[73] Assignee: Societe Italiana Telecomunicazioni Siemens S.p.A., Milan, Italy

[22] Filed: Dec. 10, 1970

[21] Appl. No.: 96,747

[30] Foreign Application Priority Data

Dec. 10, 1969 Italy ....................25562 A/69

[52] U.S. Cl. ....................328/6 Z, 307/220, 307/271, 328/14

[51] Int. Cl. ....................H03k 3/72

[58] Field of Search ....235/92, 37, 57, 197; 307/220, 307/271; 328/14, 41, 61, 62

[56] References Cited

UNITED STATES PATENTS

| | | | |
|---|---|---|---|
| 3,358,068 | 12/1967 | Campbell, Jr. | 328/62 X |
| 3,464,018 | 8/1969 | Cliff | 307/271 X |
| 3,267,381 | 8/1966 | Thornberg et al. | 307/220 X |
| 3,212,010 | 10/1965 | Podlesny | 328/41 |
| 3,268,821 | 8/1966 | Wang | 328/62 |
| 3,295,065 | 12/1966 | Brown | 328/62 |
| R26,521 | 2/1969 | Park | 84/1.03 |
| 3,469,109 | 9/1969 | Schrecongost | 307/220 |
| 3,544,906 | 12/1970 | Dulaney et al. | 328/14 |
| 3,551,822 | 12/1970 | McNelis | 328/62 |

*Primary Examiner*—Donald D. Forrer
*Assistant Examiner*—R. C. Woodbridge
*Attorney*—Karl F. Ross

[57] ABSTRACT

A train of regularly recurring clock pulses of cadence $f_k = 2^{n+m}d$, with m n, is fed to an n-stage binary frequency divider generating at its various stage outputs a set of square waves whose fundamental frequencies are subharmonically related to that cadence. Selective combination of the original clock pulses with one or more of these square waves, at least one of them in negated form, by means of different NAND gates yields sequences of short equispaced pulses recurring at these subharmonic frequencies in mutually staggered relationship; thus, a superposition of all or less than all of these pulse sequences by means of OR gates produces up to $2^n-1 = N$ regular and irregular pulse groupings each recurring at the lowest subharmonic frequency $f_k/2^n = 2^m d$, the number K of pulses in these groupings ranging between 1 and N. Upon further subdivision by m cascaded flip-flops, there is obtained a final square wave of mean fundamental frequency Kd whose pulses may vary in length by only a small fraction of a cycle, depending upon the magnitude of m, and which may be frequency-modulated by the selective suppression of one or more constituent pulse sequences supplied to the corresponding OR gate.

5 Claims, 6 Drawing Figures

Enrico CICOGNANI
Evangelo LYGHOUNIS
*INVENTORS*

BY Karl F. Ross
Attorney

Enrico CICOGNANI
Evangelo LYGHOUNIS

*INVENTORS*

*BY*

Attorney

KEY MODULATED PULSE-TRAIN GENERATOR FOR TELECOMMUNICATION SYSTEM

Our present invention relates to a multifrequency generator designed to provide a multiplicity of discrete frequency channels for data-transmission, telegraphy and other communication systems using a single frequency or a small number of closely spaced frequencies per channel.

The general object of our invention is to provide a system of this type wherein a large number of carrier or keying frequencies may be derived from a single pulse source, such as a quartz-stabilized oscillator, to insure maximum absolute and relative frequency stability of the several channels.

A more specific object is to provide a multifrequency generator of this type which can be realized with relatively simple logical circuitry and which obviates the problems of calibration, frequency drifts and limited tuning range of conventional oscillators.

A further object is to provide improved switchover means for changing from one keying frequency to another without major phase discontinuities giving rise to objectionable transients.

It is also an object of our invention to provide a new class of oscillation generators using identical components, which may be readily standardized, for producing sets of frequencies in widely different ranges.

These objects are realized, pursuant to our present invention, by the provision of a source of high-frequency clock pulses recurring at a fixed cadence $f_k$, such as a quartz-stabilized oscillator provided with the usual limiting, differentiation and pulse-shaping circuits in its output; a first binary frequency devider with $n$ cascaded stages is connected to receive the train of clock pulses issuing from this source to derive therefrom a set of square waves whose fundamental frequencies are subharmonically related to the cadence $f_k$ of these pulses and which are available at respective outputs of the $n$ divider stages. Different combinations of signals, including the original clock pulses together with one or more square waves from these divider outputs, are fed to a plurality of coincidence gates deriving therefrom respective pulse sequences each having a pulse width substantially equal to that of the clock pulses; the recurrence rate of each of these pulse sequences equals the fundamental frequency of the longest square wave received by the corresponding coincidence gate. The pulses thus produced, hereinafter referred to as counting pulses, are mutually staggered in their concurrently generated pulse sequences so as to be readily combinable, by suitable logic circuitry such as a set of OR gates, to provide groupings of evenly or unevenly spaced counting pulses varying in number between 1 and an integer N whose maximum value is $2^n -1$; we therefore may concurrently generate up to N different groupings of counting pulses, the number K of such counting pulses being different for each grouping and ranging between 1 and N. These groupings, which have a common repetition frequency of $f_k/2n$, are then passed through a second binary frequency divider of $m$ cascaded stages, with $m$ preferably equal to or greater than $n$. The output of each chain of stages of this second divider is a final square wave with a mean fundamental frequency equal to $Kf_k/2^{n+}$m. Given a sufficiently high value of $m$, the pulses of this final square wave will vary in width by not more than a small fraction of a cycle.

Since the output frequency realized by this system is an invariable function of the number of counting pulses fed into the second divider with each pulse sequence during an invariable reference period $2^nT_k$, $T_k = 1/f_k$ being the cycle length of the clock-pulse generator, and since the number K of these counting pulses is determined solely by the logic of the coupling network between the two dividers, this frequency is independent of temperature and other ambient factors so long as the cadence of the clock pulses remains stable.

Advantageously, the stages of the first divider (with the possible exception of the last stage thereof) have paired outputs on which the signals are relatively inverted, such as the set and reset outputs of a flip-flop, these paired outputs being connected to respective inputs of different coincidence (e.g. NAND) gates; this insures in a relatively simple manner the requisite staggering of the series of counting pulses delivered by the several coincidence gates.

If it is desired to modulate the frequency of the final square wave appearing in the output of any branch of the second divider, it is only necessary to provide means for the selective suppression of one or more constituent pulse sequences in the input of the corresponding OR gate. In a more elaborate arrangement, a lead carrying a modulating signal may have two branches each connected to one or more AND gates inserted between the outputs of respective coincidence gates and the corresponding inputs of an OR gate to which these outputs are tied; by including an inverter in one of these two branches, we can alternately supplement a basic pulse count by different numbers of counting pulses per reference period $2^nt_k$.

The invention will be described in greater detail hereinafter with reference to the accompanying drawing in which.

Figure 1:
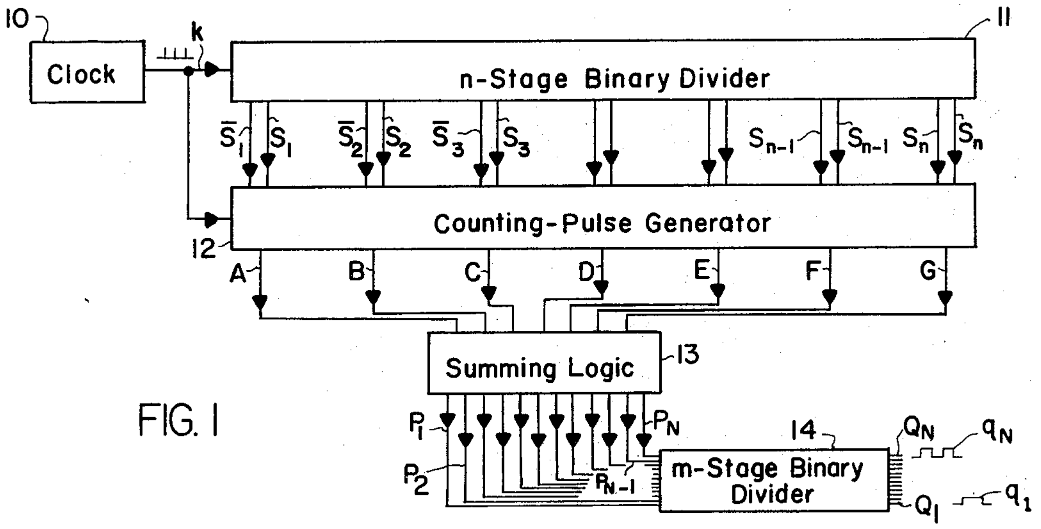
FIG. 1 is a block diagram of a multifrequency generator embodying our invention.

In FIG. 1 we have shown an oscillator 10, preferably of the quartz-stabilized type (see as FIG. 2), generating a train of clock pulses of fixed cadence on a lead $k$ terminating at the input of an $n$-stage binary divider 11 and, in parallel therewith, at a counting-pulse generator 12 receiving the signals from the several inverting and noninverting outputs $\bar{S}_1$, $S_1$, $\bar{S}_2$, $S_2$, . . . $\bar{S}_{n-1}$, $S_{n-1}$, $\bar{S}_n$, $S_n$ of the several divider stages. Pulse generator 12 has a plurality of output leads A–G whose number, here seven, may be equal to or less than the number $n$ of stages in divider 11. These output leads extend to a logic network 13 including circuitry for selectively combining or summing the counting pulses emanating from generator 12. A multiplicity of output leads $P_1$, $P_2$, . . . . . $P_{N-1}$, $P_N$ deliver respective groupings of counting pulses to a second binary divider 14 having N parallel branches each with $m$ stages terminating in outputs $Q_1 - Q_N$ which carry respective square waves $q_1 - q_N$. These square waves, if desired, may be sent through suitable low-pass filters, not shown, to convert them into sinusoidal oscillations prior to transmission over respective communication channels.

Figure 2:
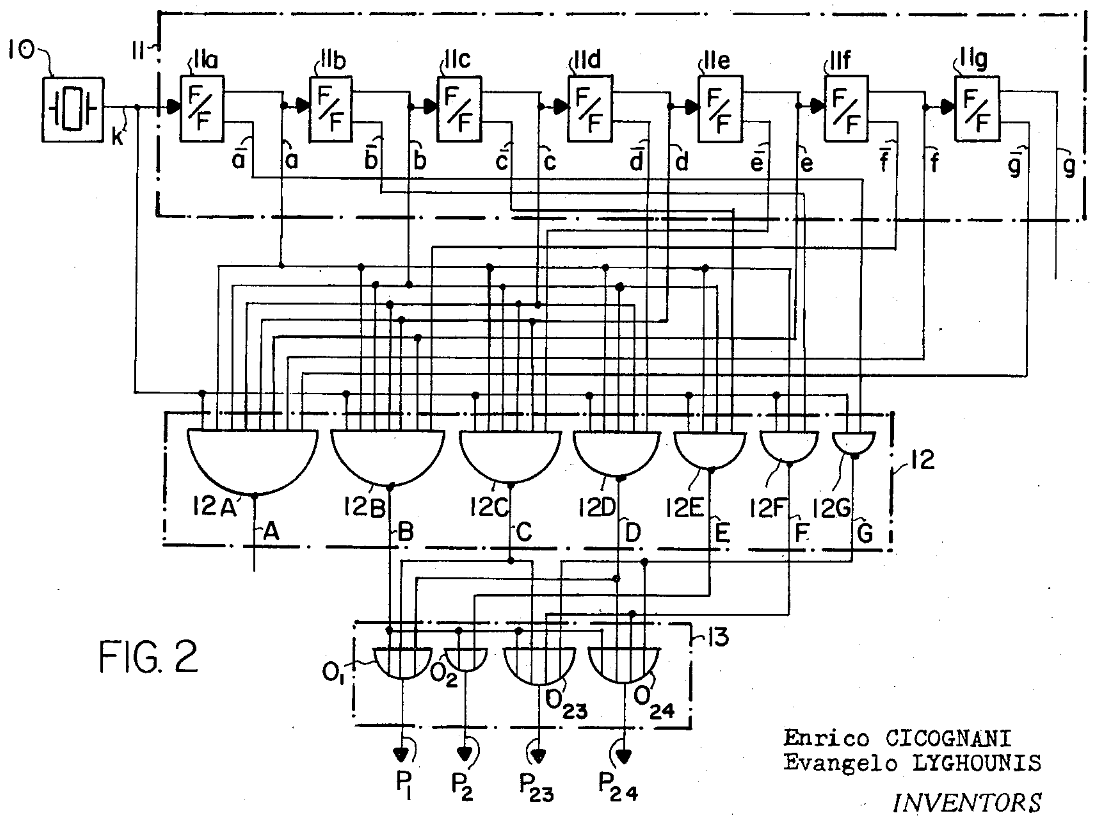
FIG. 2 is a more detailed circuit diagram of some of the components of the system of FIG. 1.

FIG. 2 shows details of the first divider 11 whose internal construction may be similar to that of the second divider 14 of FIG. 1. Divider 11 comprises seven cascaded flip-flops 11$a$ – 11$g$ with respective set and reset output leads $a, \bar{a}, \ldots, g, \bar{g}$. Summing logic 12 includes seven NAND gates 12A–12G with a progressively decreasing number of inputs, the first NAND gate 12A having eight such inputs whereas the last NAND gate 12G has only two. One input of each NAND gate is connected to the output conductor $k$ of oscillator 10 while the remaining input or inputs are connected to different numbers of consecutive flip-flops, specifically to the reset output of the last flip-flop of the series and to the set outputs of all the preceding flip-flops. Thus, NAND gate 12A receives signals from leads $a, b, c, d, e, f$ and $\bar{g}$, NAND gate 12B is tied to leads $a, b, c, d, e$ and $\bar{f}$, and so forth, with the second input of gate 12G connected to lead $\bar{a}$.

Figure 3:
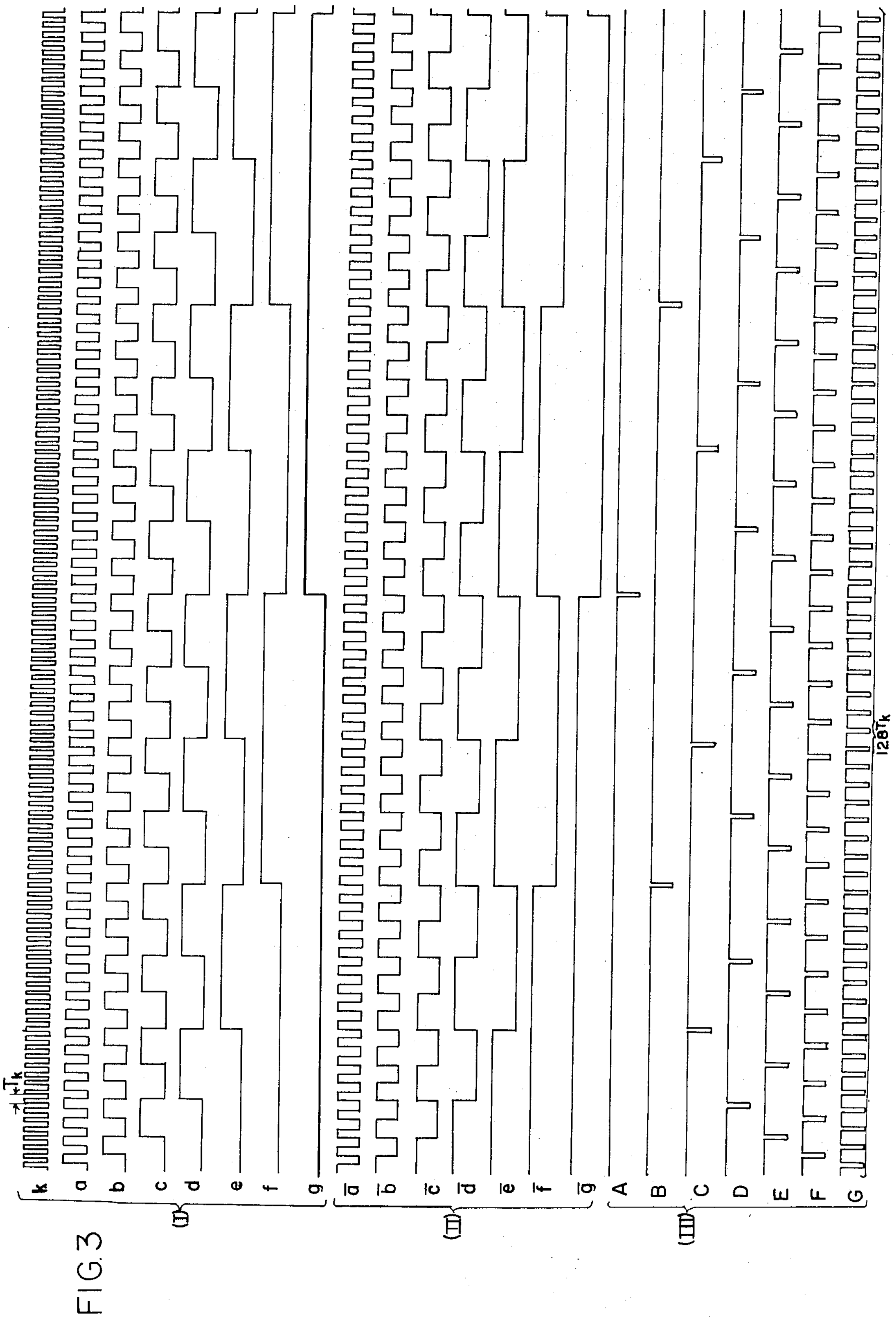
FIG. 3 shows three sets of graphs relating to the operation of the system.

FIG. 3 (I) shows the train of clock pulses on lead $k$, having a period $T_k$, along with the several square waves generated on leads $\bar{a}$–$\bar{g}$ which are subharmonically related to the cadence of this pulse train. FIG. 3 (II) shows the corresponding inversions as delivered by leads $a$–$g$. FIG. 3 (III) indicates the number of counting pulses coming into existence, during a reference period equal to 128$T_k$, on each of the output leads A–G of NAND gates 12A–12G. It will be noted that, owing to the aforedescribed connections between these NAND gates and the associated flip-flops, all these pulse sequences are relatively staggered so that no two pulses on any of leads A–G ever coincide. Only the phasing but not the mutual staggering of these pulses would be altered if some of the set and reset flip-flop outputs were interchanged, i.e., if one or more of the graphs of FIG. 3 (I) were replaced by corresponding graphs of FIG. 3 (II).

As further shown in FIG. 2, logic network 13 includes a number of OR gates $O_1, O_2, \ldots O_{23}, O_{24}$ associated with 24 frequency channels, the intervening OR gates having not been illustrated. The total number $N = 24$ of these channels is only a fraction of the theoretical maximum of $2^n-1$, i.e., 127 if $n = 7$. The corresponding frequencies appearing in the output of divider 14 (FIG. 1) may be keyed or otherwise modulated, in a manner well known per se and not further illustrated, to carry messages over respective telecommunication channels.

Of the 127 different possible groupings of counting pulses, seven — i.e., the sequences shown in FIG. 3 (III) — are directly available at the outputs of the several NAND gates of circuit 12 and do not require any OR gates for their generation. These seven regular pulse sequences can be said to recur identically with a repetition frequency of $f_k/128$ ($f_k$ being the cadence of oscillator 10), as do the groupings of non-uniformly spaced pulses obtained by an additive combination of two or more of the pulse sequences from leads A – G. The mean repetition frequency of these counting pulses thus equals $Kf_k/128$, with K ranging between 1 and 127. This mean repetition frequency is stepped down in divider 14 by a factor of $2^m$ with a proportional reduction of the relative variation in cycle length; reference may be made in this connection to commonly owned application Ser. No. 36,252 filed 11 May 1970 by Emanuele Angeleri and Fabio Balugani, now U.S. Pat. No. 3,657,226. With $m = 10$, for example, the improvement in cycle uniformity is approximately 1,000 : 1; thus, a deviation of ±180° (the theoretical maximum) is reduced to substantially less than ±1°, actually about 42', with $m = 8$ and to approximately 10' with $m = 10$.

If we select $f_k = 2^n 2^m d$, with $d$ preferably an integer, we obtain a mean frequency of $K2^m d$ in the output of logic circuit 13 and of $Kd$ in the output of divider 14. With $d = 1$ we thus generate all the integral frequencies from 1 through 127 Hz.

With $d = 30$, $n = 7$ and $m = 10$, we obtain $f_k = 3{,}932{,}160$ Hz as our clock frequency. With the same clock frequency, $d$ can be doubled or quadrupled if the number $n$ of divider stages is reduced by 1 or 2, respectively.

In the following Table we have shown the frequency distribution of a multichannel system according to the invention designed for three different keying rates, e.g., of 50, 100 and 200 Baud, with 24 channels for low-speed switchover at 50 Baud, 12 channels for medium-speed switchover at 100 Baud, and 6 channels for high-speed switchover at 200 Baud. It will be noted that each channel utilizes two keying frequencies separated by 2d Hz, with the mean channel frequency ranging from 420 Hz to 3,180 Hz. A receiver capable of reliably discriminating between frequncies so closely spaced has been disclosed in commonly owned application Ser. No. 93,537 filed on or about 30 Nov. 1970 by Fabio Balugani and Paolo Fornasiero, now U.S. Pat. No. 3,660,771. If necessary, of course, the frequency spacing may be increased.

TABLE

| | low-speed keying | medium -speed | high-speed keying |
|---|---|---|---|
| N numbered of channels | 24 | 12 | 6 |
| keying speed (Baud) | 50 | 100 | 200 |
| n number of stages in first divider | 7 | 6 | 5 |
| K number of counting pulses per period $2^n/f_k$ | 14+4 (N−1)±1 | 8+4 (N−1)±1 | 5+4 (N−1)±1 |
| d multiplication factor | 30 | 60 | 120 |
| keying frequencies | 420+120 (N−1)±30 ± | 480+240 (N−1)±60 | 600+480 (N−1)±120 |
| mean channel frequency | 420+120 (N−1) | 480+240 (N−1) | 600+480 (N−1) |

Figure 4:
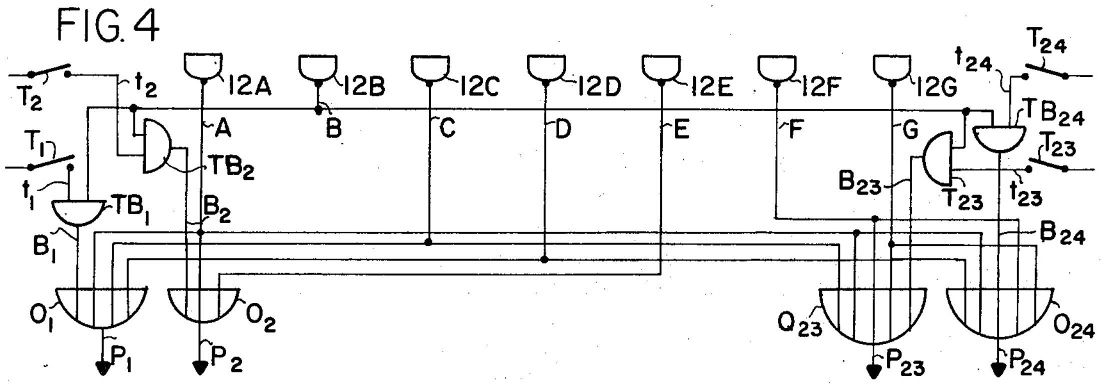
FIGS. 4–6 show partial modifications of the circuit arrangement of FIG. 2.

FIG. 4 shows circuitry for generating the 24 two-frequency channels listed in the first column of the Table. The first of these channels, represented by lead $P_1$, includes an OR gate $O_1$ with four inputs respectively tied to leads A, C, D and to an output $B_1$ of an AND gate $TB_1$ receiving the pulse sequence of lead B together with a modulating signal on a lead $t_1$ controlled by a key $T_1$. With this key unoperated, the number K of counting pulses per reference period issuing from OR gate $O_1$ equals 13 as can be readily ascertained from FIG. 3 (III). With key $T_1$ depressed, K is increased to 15, giving an average of 14 corresponding (with $d = 30$) to a pair of keying frequencies of 390 and 350 Hz centered on a mean channel frequency of 420 Hz. In an analogous manner, the second channel of this group includes an OR gate $O_2$ with output lead $P_2$, two inputs of this OR gate being tied to leads A and E while its third input is set via a lead $B_2$ from an AND gate $TB_2$ receiving the pulse sequence on lead B along with a modulating signal on a conductor $t_2$ controlled by a key $T_2$. This channel, therefore, has two keying frequencies of 510 Hz ($K = 17$) and 570 Hz ($K = 19$) centered on a mean channel frequency of 540 Hz. The 23rd channel is represented by an OR gate $O_{23}$ with output lead $P_{23}$ and with four inputs respectively energized from leads A, C, F and G, a fifth input being connected to an output lead $B_{23}$ of an AND gate $TB_{23}$ receiving again the pulse sequence of lead B along with a modulating signal on a conductor $t_{23}$ controlled by a key $T_{23}$. Here we have a count K varying between 101 and 103 which corresponds to output frequencies of 3,030 and 3,090 Hz, respectively. The last channel has an OR gate $O_{24}$ with output lead $P_{24}$ and four inputs tied to leads A, D. F and G, the fifth input being connected to an output lead $B_{24}$ of an AND gate $TB_{24}$ energized from lead B and from a modulating conductor $t_{24}$ controlled by a key $T_{24}$. Here, K varies between 105 and 107, corresponding to keying frequencies of 3,150 and 3,210 Hz, respectively.

Figure 5:
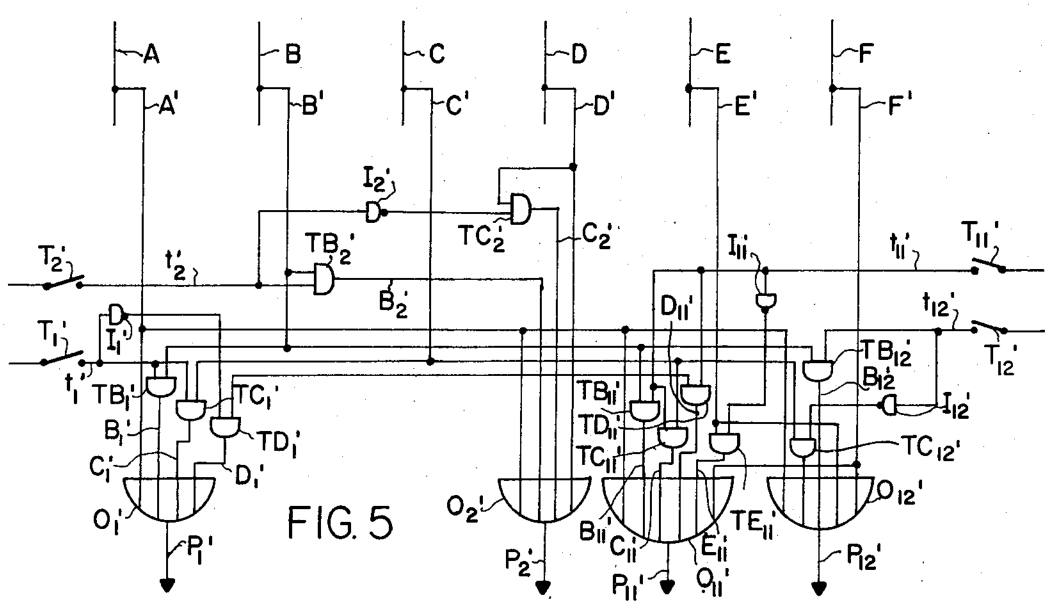

It will be noted than AND gate $TB_1$ in the input of OR gate $O_1$ is traversed, when conductive, by a relatively low-rate pulse sequence (B) while being bypassed by several relatively high-rate pulse sequences (C,D). Similar conditions exist at the other OR gates, with selective blocking of the low-rate pulse sequence B by the switch means $T_1 - T_4$. FIG. 5 shows a modified summing network with OR gates $O_1'$, $O_2'$, $O_{11}'$ and $O_{12}'$ for the first two and the last two channels listed in the second column of the Table, their output leads having been designated $P_1'$, $P_2'$, $P_{11}'$, $P_{12}'$. The first channel is controlled by a key $T_1'$ whose conductor $t_1'$ has a first branch terminating at two AND gates $TB_1'$, $TC_1'$ and a second branch which includes an inverter $I_1'$ and leads to another AND gate $TD_1'$. The output leads $B_1'$, $C_1'$, $D_1'$ of these AND gates are tied to respective inputs of OR gate $O_1'$ which also has a further input connected to a branch A' of conductor A. With key $T_1'$ depressed, the pulses appearing on lead A are supplemented by those present on leads B and C via respective branches B' and C' connected to AND gates $TB_1'$ and $TC_1'$. With the key unoperated, the only supplemental pulses are those appearing on lead D and communicated to AND gate $TD_1'$ via a branch D' thereof. This results in a count K varying between 7 and 9, which corresponds (with $d = 60$) to keying frequencies of 420 and 540 Hz, respectively. OR gate $O_2'$ has two inputs directly tied to leads A' and D' along with two further inputs connected to leads B' and C' by way of respective AND gates $TB_2'$ and $TC_2'$ with outputs $B_2'$, $C_2'$ and with second inputs served by respective branches of a modulating lead $t_2'$ controlled by a key $T_2'$, the branch connected to gate $TC_2'$ including an inverter $I_2'$. Thus, the count K varies between 11 and 13, representing output frequencies of 660 and 780 Hz. OR gate $O_{11}'$ has two inputs directly connected to leads A' and F', four other inputs being fed from output leads $B_{11}'$, $C_{11}'$, $D_{11}'$ and $E_{11}'$ via respective AND gates $TB_{11}'$, $TC_{11}'$, $TD_{11}'$, $TE_{11}'$ with input connections to extensions B', C', D', E' of leads B, C, D and E. The second inputs of AND gates $TB_{11}'$, $TC_{11}'$ and $TD_{11}'$ are connected to a noninverting branch of a modulating conductor $t_{11}'$ controlled by a key $T_{11}'$, another branch of this conductor being connected via an inverter $I_{11}'$ to the second input of AND gate $TE_{11}'$. This results in a variation of K between 47 and 49, corresponding to output frequencies 2,820 and 2,940 Hz, respectively. OR gate $O_{12}'$, finally, has three inputs directly tied to conductors A', E' and F' as well as two other inputs supplied from leads B' and C' by way of AND gates $TC_{12}'$ with outputs $B_{12}'$ and $C_{12}'$, a modulating conductor $t_{12}'$ controlled by a key $T_{12}'$ serving the AND gate $TB_{12}'$ through a noninverting branch and the AND gate $TC_{12}'$ through a branch containing an inverter $I_{12}'$. In this instance, K varies between 51 and 53, corresponding to output frequencies of 3,060 and 3,180 Hz.

Figure 6:
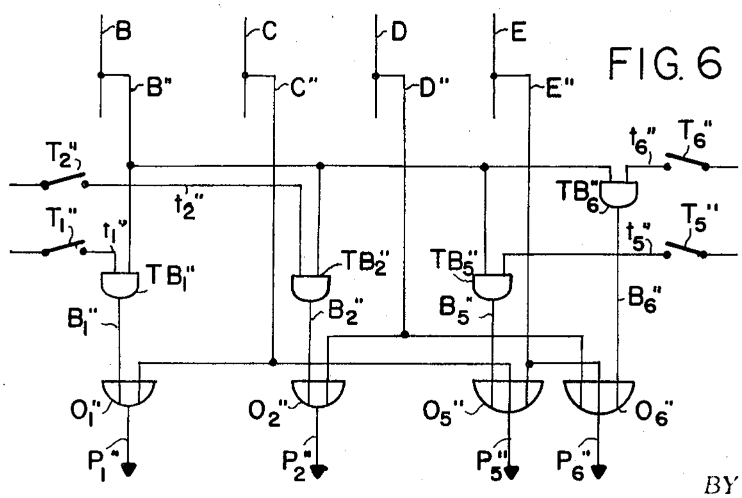

The circuitry of FIG. 6 is generally similar to that of FIG. 4, with the first two and the last two channels of the six-channel group listed in the third column of the Table represented by OR gates $O_1''$, $O_2''$, $O_5''$, $O_6''$ having output leads $P_1''$, $P_2''$, $P_5''$, $P_6''$. An extension B'' of lead B is connected to an input of each of these OR gates by way of respective AND gates $TB_1''$, $TB_2''$, $TB_5''$, $TB_6''$ having outputs $B_1''$, $B_2''$, $B_5''$, $B_6''$, the second inputs of these AND gates being served by respective modulating conductors $t_1''$, $t_2''$, $t_5''$ and $t_6''$ with control keys $T_1''$, $T_2''$, $T_5''$, $T_6''$.

OR gate $O_1''$, is also energized by an extension C'' of lead C so that, depending upon the position of key $T_1''$, the count K shifts between 4 and 6; this corresponds (with $d = 120$) to output frequencies of 480 and 720 Hz, respectively. OR gate $O_2''$ has a second input tied to an extension D'' of lead D, making the count vary between 8 and 10 which represents output frequencies of 960 and 1,200 Hz. OR gate $O_5''$ has two further inputs respectively connected to lead C'' and to an extension E'' of lead E; this accounts for a value of K varying between 20 and 22, giving rise to respective output frequencies of 2,400 and 2,640 Hz. OR gate $O_6''$, finally, also has two further inputs which are energized from leads D'' and E'', respectively, whereby K is either 24 or 26 to yield output frequencies of 2,880 or 3,120 Hz.

It will be understood that the three channel systems shown in FIGS. 4–6 may be utilized together, being then energized from the same set of NAND (or possibly AND) gates in network 12, or individually and that the specific frequency values listed in the Table are merely given by way of example.

We claim:

1. A system for the simultaneous generation of several frequency-modulated pulse trains for multichannel telecommunication, comprising:

a source of clock pulses recurring at a fixed cadence $f_k$;

a first binary frequency divider with n cascaded stages connected to receive the train of clock pulses from said source for deriving therefrom a set of square waves of different fundamental frequencies subharmonically related to said fixed cadence, said square waves being available at respective outputs of said $n$ stages;

a plurality of coincidence gates connected to receive different combinations of square waves from said outputs with said train of clock pulses from said source for deriving therefrom respective pulse sequences each with a pulse width substantially equal to that of said clock pulses and with a recurrence rate equal to the fundamental frequency of the longest square wave received by the corresponding coincidence gate, said pulse sequences being mutually staggered;

logical circuitry including a set of OR gates for selectively combining certain of said pulse sequences to derive therefrom up to N different pulse groupings all recurring identically with a repetition frequency of $f_k/2^n$, N having a maximum value of $2^n-1$, the number K of pulses in said groupings being different for each grouping and ranging between 1 and N, said logical circuitry further including gating means in the input of each OR gate connected to be traversed by at least one relatively low-rate pulse sequence while being bypassed by at least one relatively high-rate pulse sequence in noncoincident relationship with said low-rate pulse sequence;

high-speed telegraphic keying means connected to said gating means for selectively suppressing said relatively low-rate pulse sequence in the input of any OR gate to produce an alternation between two different pulse trains; and a second binary frequency divider with m cascaded stages for each of said groupings connected to convert same into an alternation of two final square waves of different but substantially constant keying frequencies centered on a mean fundamental frequency equal to $Kf_k/2^{n}{}_{+}{}^{m}$.

2. A system as defined in claim 1 wherein $m > n$.

3. A system as defined in claim 1 wherein at least some of the stages of said frequency divider have paired outputs with relative signal inversion connected to different coincidence gates.

4. A system as defined in claim 1 wherein said gating means includes a plurality of AND gates feeding a common OR gate, said switch means comprising a key for selectively energizing a lead with a noninverting branch connected to certain of said AND gates and with an inverting branch connected to other of said AND gates.

5. A system as defined in claim 1 wherein said coincidence gates are NAND gates.

* * * * *